United States Patent [19]

Melquist et al.

[11] 4,199,476

[45] Apr. 22, 1980

[54] OLEFIN POLYMERIZATION CATALYST

[75] Inventors: John L. Melquist; Glen R. Hoff, both of Naperville, Ill.

[73] Assignee: Standard Oil Company (Indiana), Chicago, Ill.

[21] Appl. No.: 935,891

[22] Filed: Aug. 23, 1978

[51] Int. Cl.$^2$ .............................................. C08F 4/64
[52] U.S. Cl. ............................ 252/431 R; 252/429 C; 526/124
[58] Field of Search ........................ 252/431 R, 429 C

[56] References Cited

U.S. PATENT DOCUMENTS

| | | | |
|---|---|---|---|
| 3,400,110 | 9/1968 | Dassesse et al. | 252/429 C X |
| 3,644,318 | 2/1972 | Diedrich et al. | 252/431 R X |
| 3,758,621 | 9/1973 | Morikawa et al. | 252/429 B X |
| 3,784,481 | 1/1974 | Lassau et al. | 252/429 C X |
| 3,901,863 | 8/1975 | Berger et al. | 252/429 C X |
| 4,128,502 | 12/1978 | Kildahl et al. | 252/429 C X |

*Primary Examiner*—Patrick Garvin
*Attorney, Agent, or Firm*—Stephen L. Hensley; William T. McClain; William H. Magidson

[57] ABSTRACT

Alpha-olefin polymerization catalyst comprising (A) a solid component which is the reaction product of components comprising (1) an alkylaluminum halide and (2) a liquid reaction product prepared by reacting components comprising a magnesium (II) alkoxide and a titanium (IV) alkoxyhalide in the absence of hydrocarbon diluent; and (B) an organoaluminum promoter.

12 Claims, No Drawings

OLEFIN POLYMERIZATION CATALYST

BACKGROUND OF THE INVENTION

This invention relates to alpha-olefin polymerization catalysts, and more particularly, to catalysts comprising an organoaluminum promoter and the reaction product of a magnesium (II) alkoxide, a titanium (IV) alkoxyhalide, and an alkylaluminum halide.

In the low pressure polymerization of alpha-olefins substantial economic benefits can be derived by carrying out the polymerization in the presence of highly active catalysts such that polymeric products are produced in yields high enough to eliminate the need for removal of catalyst residues. To this end catalysts comprising an organoaluminum promoter and a transition metal compound bonded to a support material have been proposed.

One such catalyst, described in U.S. Pat. No. 3,644,318 to Diedrich et al., comprises an organoaluminum promoter and a solid component prepared by reacting a titanium (IV) halide or alkoxyhalide with a magnesium (II) alkoxide at 0° to 200° C. in an aliphatic, cycloaliphatic, or aromatic diluent. The resulting hydrocarbon insoluble product is then separated from the diluent and washed in a material capable of dissolving any unreacted titanium (IV) compound to remove the same. The washed component then is activated with an organoaluminum promoter at 20° to 150° C. and employed in the polymerization of alpha-olefins. Alternatively, the washed product is treated with an organoaluminum compound at −30° to 100° C. prior to polymerization, and, when the organoaluminum compound employed contains chlorine, the treated product is washed and then activated with a promoter at 20° to 150° C.

While the above-described catalysts exhibit sufficiently high activities to eliminate the need for removal of catalyst residues from polyalpha-olefins produced in the presence thereof, difficulties are encountered in catalyst preparation because a hydrocarbon insoluble solid is formed on reaction of the magnesium (II) alkoxide with the titanium (IV) halides or alkoxyhalides in the presence of aliphatic, cycloaliphatic, or aromatic diluents. Not only are large amounts of inert diluent required to suspend this solid so as to facilitate subsequent preparative steps, such as treatment with an organoaluminum compound at −30° to 100° C. according to Diedrich et al., but also, unless the solid is separated from the diluent and washed, incompletely reacted components and undesirable reaction by-products which are soluble in the diluent will remain in the sysem during subsequent preparative steps.

As can be appreciated from the foregoing, it would be desirable to improve the catalysts of Diedrich et al. in terms of preparative ease and economy while maintaining the desirable polymerization activities thereof. It is an object of this invention to provide such an improved catalyst and a method for the preparation thereof. A further object of the invention is to provide for the polymerization of alpha-olefins in the presence of the invented catalysts. Other objects of the invention will be apparent to persons of skill in the art from the following description and the appended claims.

It has now been found that the objects of this invention can be achieved by reacting a magnesium (II) alkoxide with a titanium (IV) alkoxyhalide under conditions such that a liquid, easily handled reaction product is obtained, and then reacting this liquid with an alkylaluminum compound to form a solid catalyst component. Similar to the catalyst components of Diedrich et al., the invented components can be promoted with an organoaluminum promoter and employed in the polymerization of alpha-olefins to polymers having a relatively broad molecular weight distribution and in sufficiently high yields that separation of catalyst residues from the polymeric product is unnecessary. However, unlike Diedrich et al., wherein a magnesium (II) alkoxide and a titanium (IV) alkoxyhalide are reacted in a hydrocarbon diluent to form a solid product suspended in the diluent, the catalysts of the present invention are prepared in a manner which takes advantage of the solubility of magnesium (II) alkoxides in titanium (IV) alkoxyhalides and the fact that when such compounds are reacted neat, that is, in the absence of a hydrocarbon diluent, a liquid reaction product is formed. As a result, there is no need to use large amounts of hydrocarbon diluent to suspend a solid reaction product so as to facilitate subsequent preparative steps. Moreover, there is no need to wash the neat, liquid reaction product because undesirable reaction by-products can be removed with an inert gas purge.

U.S. Pat. No. 3,901,863, to Berger et al. may be of interest to the present invention in disclosing alpha-olefin polymerization catalysts comprising an organoaluminum promoter and a supported component which may be prepared by reaction of an alkylaluminum halide with the product formed by reaction, in the absence of a diluent, of a magnesium (II) alkoxide with a titanium (IV) compound capable of dissolving the magnesium compound. The invented catalysts are distinguishable from those of Berger et al. because the titanium (IV) alkoxyhalides employed according to this invention are expressly excluded from the titanium (IV) compounds utilized according to Berger et al.

DESCRIPTION OF THE INVENTION

Briefly, the catalysts of this invention comprise (A) a solid component which is the reaction product of components comprising (1) an alkylaluminum halide and (2) a neat, liquid reaction product of components comprising a magnesium (II) alkoxide and a titanium (IV) alkoxyhalide; and (B) an organometallic promoter. As used herein, "neat, liquid reaction product" is defined as a liquid reaction product prepared in the absence of hydrocarbon diluent.

Alkylaluminum halides useful in preparation of the solid component, (A), of the invented catalysts include compounds represented by the structural formula $AlR_nX_{3-n}$ wherein R is an alkyl radical of 1 to about 20 carbon atoms; and preferably 1 to about 6 carbon atoms, X is halogen, and preferably chlorine or bromine, and n is greater than 0 and less than 3, and preferably from about 1 to about 2. Examples of such compounds include dimethyl-, diethyl-, diisobutyl-, di-n-hexyl-, and diisooctylaluminum chlorides and bromides; methyl-, ethyl-, isobutyl-, n-hexyl-, and isooctylaluminum sesquichlorides, sesquibromides, dichlorides, and dibromides. Combinations of such compounds also can be utilized. Alkylaluminum halides which are preferred are alkylaluminum dichlorides wherein the alkyl radical contains from 1 to about 6 carbon atoms, and particularly, ethylaluminum dichloride.

Magnesium (II) alkoxides useful in preparation of the (A) component of the invented catalysts include compounds of the formula $Mg(OR_1)(OR_2)$ wherein $R_1$ and $R_2$ are the same or different and are alkyl radicals of 1 to about 20 carbon atoms. Examples include $Mg(OCH_3)_2$, $Mg(OC_2H_5)_2$, $Mg(OC_4H_9)_2$, $Mg(OC_8H_{17})_2$, $Mg(OC_{12}H_{25})_2$, $Mg(OCH_3)(OC_2H_5)$, $Mg(OC_2H_5)(OC_5H_{11})$, $Mg(OC_6H_{13})(OC_{10}H_{21})$, and so forth. Mixtures also can be employed. Preferred magnesium (II) alkoxides are those compounds in which $R_1$ and $R_2$ in the above formula are the same and are lower alkyl radicals of 1 to about 6 carbon atoms such as methyl, ethyl, propyl, butyl, pentyl, and hexyl. More preferably, the magnesium (II) alkoxide is magnesium (II) ethoxide.

Useful titanium (IV) alkoxyhalides include compounds which are liquids at reaction temperatures having the formula $Ti(OR)_mX_{4-m}$ wherein R is an alkyl radical of 1 to about 20 carbon atoms and preferably 1 to about 6 carbon atoms, X is halogen and preferably chlorine or bromine, and m is greater than 0 and less than 4. Examples of useful titanium (IV) compounds include $Ti(OCH_3)Br_3$, $Ti(OC_2H_5)Cl_3$, $Ti(OC_4H_9)Cl_3$, $Ti(OC_6H_{13})I_3$, $Ti(OC_{10}H_{21})Cl_3$, $Ti(OCH_3)_2Cl_2$, $Ti(OC_3H_7)_2Br_2$, $Ti(OC_5H_{11})_2Cl_2$, $Ti(OC_9H_{19})_2Cl_2$, $Ti(OCH_3)_3Cl$, $Ti(OC_2H_5)_3Cl$, $Ti(OC_4H_9)_3Cl$, $Ti(OC_8H_{17})_3I$, and $Ti(OC_{12}H_{25})_3Cl$. Mixtures also can be employed. It is convenient to prepare the titanium (IV) alkoxyhalides by reaction of appropriate titanium tetrahalides, such as $TiCl_4$, $TiI_4$, $TiBr_4$, with titanium tetraalkoxides, such as $Ti(OCH_3)_4$, $Ti(OC_2H_5)_4$, $Ti(OC_4H_9)_4$, $Ti(OC_6H_{13})_4$, $Ti(OC_8H_{17})_4$, and $Ti(OC_{12}H_{25})_4$ in amounts and under conditions known to persons skilled in the art. As described in greater detail below, when this method is employed to prepare titanium (IV) alkoxyhalides to be employed according to this invention, it is contemplated to form the alkoxyhalide either prior to or during reaction with the magnesium (II) alkoxide component employed in the preparation.

Titanium (IV) alkoxyhalides which are preferred according to this invention are the alkoxychlorides and alkoxybromides having 1 to about 6 carbon atoms per alkoxy radical, and more particularly the trialkoxychlorides. Most preferably, titanium tributoxychloride is employed.

The solid component, (A), of the invented catalysts is prepared by reacting the above-described magnesium (II) alkoxide and liquid titanium (IV) alkoxyhalide components neat to form a neat, liquid product which is then treated with the above-described alkylaluminum halide component to form a solid catalyst component.

In somewhat greater detail, the neat, liquid, magnesium (II) alkoxide-titanium (IV) alkoxyhalide reaction product is prepared by combining the magnesium (II) alkoxide and liquid titanium (IV) alkoxyhalide components or the magnesium (II) alkoxide and appropriate liquid titanium tetrahalide and solid or liquid titanium tetraalkoxide components in the absence of a diluent and the substantial absence of water, oxygen, and other catalyst poisons, and reacting such components at a temperature and for a time sufficient to form a relatively viscous liquid reaction product. The reaction can be carried out at any convenient temperature at which the components employed will react. Preferably, reaction temperatures range from about 0° to about 250° C., and more preferably, from about 60° to about 170° C. Reaction times preferably range from several minutes to several hours, and more preferably from about ½ to about 5 hours. The magnesium (II) alkoxide component and titanium (IV) alkoxyhalide component or, when employed, titanium tetrahalide and tetraalkoxide components are combined in amounts such that the molar ratio of elemental titanium to elemental magnesium ranges from about 0.1:1 to about 10:1, and preferably from about 0.5:1 to about 2:1.

The thus formed neat, liquid, magnesium (II) alkoxide-titanium (IV) alkoxyhalide reaction product is then combined with an alkylaluminum halide component, again in the substantial absence of catalyst poisons, and reacted at a temperature and for a time sufficient to form a solid catalyst component. Preferably, the alkylaluminum halide component is employed in the form of a solution in an inert hydrocarbon diluent, the diluent serving to make the component non-pyrophoric. If desired, a liquid hydrocarbon diluent can be added to the neat, liquid, magnesium (II) alkoxide-titanium (IV) alkoxyhalide reaction product prior to treatment with alkylaluminum halide. Addition of diluent at this stage of the preparation aids in dispersion of the solid catalyst component formed after treatment with alkylaluminum halide and conductance of heat away from the solid.

Suitable diluents include those materials in which the neat, liquid, magnesium (II) alkoxide-titanium (IV) alkoxyhalide reaction product and/or the alkylaluminum halide component are at least partially soluble and which are liquid at reaction temperatures. Preferred diluents are the alkanes, such as hexane, heptane, octane, nonane, and decane, although a variety of other materials including cycloalkanes such as cyclohexane, aromatics such as benzene, and ethylbenzene, and halogenated and hydrogenated aromatics such as chlorobenzene, ortho-dichlorobenzene, tetrahydronaphthalene, and decahydronaphthalene also can be employed. Prior to use, the diluent should be purified, such as by percolation through silica gel and/or molecular sieves, to remove traces of water, oxygen, polar compounds, and other materials capable of adversely affecting catalyst activity. p As indicated above, the neat, liquid, magnesium (II) alkoxide-titanium (IV) alkoxyhalide reaction product and the alkylaluminum halide component are reacted at a temperature and for a time sufficient to yield a solid catalyst component. Suitably, temperatures range from about −40° to about 250° C., and preferably, from about 0° to about 170° C. Suitable reaction times range from about ½ to about 25 hours, with about 1½ to about 8 hours being preferred.

In combining the neat, liquid reaction product with alkylaluminum halide, the latter is employed in an amount which is at least effective to halide both the magnesium and the titanium present in the neat, liquid reaction product. This amount will vary depending upon the halogen content of the alkylaluminum halide component and the titanium (IV) alkoxyhalide component employed in preparation of the neat, liquid reaction product, and is such that total mols of halogen contained in such components equals or exceeds the sum of four times the molar amount of elemental titanium employed plus two times the molar amount of elemental magnesium employed. Preferably the alkylaluminum halide is used in an amount such that total mols of halogen equals from 1 to about 5 times the aforesaid sum. Greater amounts of the alkylaluminum halide component also can be employed although there is a gradual decrease in activity with increasing amounts of the component.

As indicated above, the invented catalysts are prepared in the substantial absence of water, oxygen, and other catalyst poisons. Conveniently, such materials are excluded by carrying out the preparation under an atmosphere of nitrogen, argon or other inert gas. An inert gas purge can serve the dual purpose of excluding external contaminants during the preparation and removing undesirable reaction by-products resulting from preparation of the neat, liquid reaction product. Purification of any diluent to be employed in the second preparative step in the manner described above also is helpful in this regard.

As a result of the above-described preparation there is obtained a solid catalyst component which can be promoted with an organometallic component and employed in the low pressure polymerization of alpha-olefins. Useful organometallic components include any of the materials commonly employed as promoters for olefin polymerization catalyst components containing compounds of the Group IVB, VB, or VIB metals. Examples of such promoters include the Group IA, IIA, IIB, IIIA and IVA metal alkyls, hydrides, alkylhydrides, and alkylhalides, such as alkyllithium compounds, dialkylzinc compounds, trialkylboron compounds, trialkylaluminum compounds, alkylaluminum halides and hydrides, and tetraalkylgermanium compounds. Mixtures also can be employed. Specific examples of useful promoters include n-butyllithium, diethylzinc, di-n-propylzinc, triethylboron, triethylaluminum, triisobutylaluminum, tri-n-hexylaluminum, ethylaluminum dichloride, dibromide, and dihydride, isobutyl aluminum dichloride, dibromide, and dihydride, diethylaluminum chloride, bromide, and hydride, di-n-propylaluminum chloride, bromide, and hydride, diisobutylaluminum chloride, bromide, and hydride, tetramethylgermanium, and tetraethylgermanium. Organometallic promoters which are preferred for use according to this invention are the Group IIIA metal alkyls and dialkylhydrides having 1 to about 20 carbon atoms per alkyl radical. More preferably, the promoter is a trialkylaluminum compound having 1 to about 6 carbon atoms per alkyl radical. Most preferably, the organometallic promoter is triethylaluminum or triisobutylaluminum.

The organometallic promoter is employed in an amount which is at least effective to promote the polymerization activity of the solid component of the invented catalysts. Preferably, at least about three parts, by weight, of promoter are employed per part, by weight, of solid component, although higher ratios, such as 10:1, 25:1, 100:1 or higher also are suitable and often give highly beneficial results. In slurry polymerization processes, a portion of the promoter can be employed to pretreat the polymerization medium if desired.

The promoted catalyst component described above is employed in alpha-olefin polymerization processes wherein at least one polymerizable alpha-olefin is contacted with the catalyst under polymerizing conditions. Both slurry and solventless processes are contemplated herein. The polymerization temperature using a solventless process should be high enough to give an adequate polymerization rate but not too large to raise the pressure above that which is normally used in this type of process, i.e., up to about several hundred p.s.i.g. or soften the polymer bed contained in the reactor.

In the slurry or particle form process, the polymerization is carried out at a temperature such that the polymer as formed is a solid in the polymerization reactor. The preferred polymerization temperature is about 40° C. to about 110° C. In a vapor phase process wherein little or no liquid medium is used, the preferred temperature range is from about 40° C. to about 130° C. and, more preferably, from about 60° C. to about 120° C.

Alpha-olefins which can be polymerized using the invented catalysts include ethylene, propylene, butene-1, pentene-1, 4-methylpentene-1, and mixtures thereof as well as mixtures with dienes such as butadiene and isoprene. Preferably, the invented catalysts are employed in the polymerization of ethylene or mixtures thereof with up to about 20 mol percent of a higher alpha-olefin or a diene. Most preferably, the invented catalysts are employed in the polymerization of ethylene.

It is of particular importance for best results that the alpha-olefin be substantially free of catalyst poisons. Accordingly, it is preferred to use polymerization grade material which has been passed through a molecular sieve prior to use to remove any remaining traces of moisture, oxygen, carbon dioxide and polar organic compounds.

The organic liquid employed as the polymerization medium in the particle form process can be an alkane or cycloalkane such as butane, isobutane, pentane, hexane, heptane or cyclohexane, or a hydrogenated aromatic compound such as tetrahydronaphthalene or decahydronaphthalene, or a high molecular weight liquid paraffin or mixture of paraffins which are liquid at the polymerization temperature, or an aromatic hydrocarbon such as benzene, toluene or xylene or a halogenated aromatic compound such as chlorobenzene, chloronaphthalene or ortho-dichlorobenzene. The nature of the medium is subject to considerable variation, although the medium employed should be liquid under polymerization conditions and relatively inert. Other media which can be used include ethylbenzene, isopropylbenzene, ethyltoluene, n-propylbenzene, diethylbenzenes, mono- and dialkylnaphthalenes, n-octane, isooctane and methylcyclohexane. Preferably, a hexane or a butane is employed. For best results, the polymerization media employed in particle form polymerization should be purified to remove traces of moisture, oxygen, carbon dioxide and polar organic compounds prior to use by contacting the medium, for example, in a distillation procedure, with an organoaluminum compound, for example, triethylaluminum, prior to or after percolating the medium through silica gel or molecular sieves.

The polymerization time is not critical and will usually be on the order of thirty minutes to several hours in batch processes. Contact times of from one to four hours are commonly employed in autoclave type reactions. When the polymerization process is a continuous system, wherein polymerization medium, if any, and excess monomer are returned to a charging zone and catalyst replenished and additional monomer introduced, the contact time in the polymerization zone can be regulated as desired, and in some cases, contact times of one-half to several hours will suffice.

Preferably, the total pressure range for the polymerization process is about atmospheric to over 1000 p.s.i.g. More preferably, the polymerization pressure is greater than about 100 p.s.i.g. and, most preferably, the polymerization pressure is about 200 p.s.i.g. or higher.

The catalysts of this invention, when employed for the polymerization of olefins, typically is used with hydrogen to control molecular weight. Solid polymers having molecular weights greater than about 50,000 and less than about 3,000,000 result thereby. The amount of hydrogen to be used depends upon the molecular weight to be obtained and can be easily determined by those skilled in the art based on the examples appearing hereinbelow.

Polyolefins prepared in the presence of the catalysts of this invention exhibit a relatively broad molecular weight distribution and can be processed by a variety of techniques, including extrusion, mechanical melting, casting, and molding, to form a variety of useful articles including films, sheets, plates, and molded objects.

The following examples illustrate the present invention and are not to be construed as limiting the scope thereof.

EXAMPLE I

Into a 500 ml. flask equipped with mechanical stirrer and nitrogen purge were added 11.4 g. magnesium (II) ethoxide, 51 ml. titanium tetrabutoxide, and 5.5 ml. titanium tetrachloride. The mixture was heated at 140° C. for one hour with stirring to give a clear, brown, viscous solution. The solution was allowed to cool to ambient temperature and 193 ml. of a 50 wt.% solution of ethylaluminum dichloride in hexane were added dropwise, with stirring, over a period of about 4½ hours to give a finely divided solid catalyst component suspended in hexane. Stirring was continued for an additional 2 hours and then an additional 150 ml. hexane was added. Thereafter, 5 ml. aliquots of the suspension were diluted with 45 ml. hexane and then 5 ml. aliquots of the resulting suspension were again diluted with 45 ml. hexane. Aliquots of the resulting suspension were employed in polymerization runs according to Example IV.

The molar ratio of elemental magnesium to elemental titanium to elemental aluminum employed in preparation of this catalyst component was 1:2:6.5.

EXAMPLE II 11.4 g. magnesium (II) ethoxide, 26 ml. titanium tetrabutoxide, and 2.7 ml. titanium tetrachloride were combined and reacted according to the procedure of Example I except that the heating at 140° C. took place over 3 hours at which time the solid magnesium (II) ethoxide had completely dissolved. After the solution had cooled to ambient temperature, 100 ml. hexane was added followed by dropwise addition, over 2½ hours and with stirring, of 178 ml. of a 50 wt.% solution of ethylaluminum dichloride in hexane to form a finely divided catalyst component suspended in hexane. Stirring was continued for 4 hours after completion of the ethylaluminum dichloride addition and then 90 ml. hexane were added. Subsequently, 9 ml. aliquots of the suspension were diluted with 50 ml. hexane and then 5 ml. aliquots of the resulting suspension were diluted with 45 ml. hexane. Aliquots of the resulting suspension were employed according to Example IV.

The molar ratio of elemental magnesium to elemental titanium to elemental aluminum employed in preparation of this catalyst component was 1:1:6.

EXAMPLE III 34.2 g. magnesium (II) ethoxide, 30 ml. titanium tetrabutoxide, and 3.3 ml. titanium tetrachloride were reacted according to the procedure of Example II to give a clear solution. After cooling of the solution to 85° C., 445 ml. of a 50 wt.% solution of ethylaluminum dichloride in hexane were added dropwise over 2½ hours, with stirring. Stirring was continued for about 17 hours following completion of the ethylaluminum dichloride addition, and as a result there was obtained a finely divided solid catalyst component suspended in hexane. The suspension was diluted with additional hexane as in Example I and employed in polymerization runs according to Example IV.

The molar ratio of elemental magnesium to elemental titanium to elemental aluminum employed in preparation of this catalyst component was 1:0.4:5.

EXAMPLE IV

A series of ethylene polymerizations were conducted using the catalyst components of Examples I-III according to the following procedure. An amount of catalyst component and promoter were first stirred in 261 ml. hexane in a 500 ml. stainless steel autoclave reactor. The amount of catalyst component used was 1.0 mg. in runs employing component I, 0.96 mg. in runs employing component II, and 0.98 mg. in runs employing component III. The amount of promoter used was 40 mg. in triethylaluminum (TEA) promoted runs and 99 mg. in triisobutylaluminum (TIBA) promoted runs. After stirring of the catalyst component and promoter, hydrogen and polymerization grade ethylene were fed into the reactor. Hydrogen pressures varied from run to run as reported in Table I. Ethylene was fed at pressures sufficient to maintain a total pressure (hydrogen and ethylene) of 300 psig in the reactor throughout the polymerization. Polymerization was conducted at 180° F. over a period of one hour after which ethylene was vented from the reactor and the reactor was opened to terminate the polymerization. The resulting slurry of polyethylene in hexane was poured into a Buchner funnel to remove the hexane and dry the polymer.

The dried polymer was weighed and melt indices were determined according to ASTM-D 1238 65T Conditions E and F. For each polymerization run, catalyst component and promoter, hydrogen pressure, yield, and melt index (MI) according to ASTM-D 1238 65T Condition E are reported in Table I. The ratio ($MF_{10}/MF_1$) of melt index according to Condition F to melt index according to Condition E also is reported in the table and is an indication of polymer molecular weight distribution.

TABLE I

| CATALYST COMPONENT | PROMOTER | $H_2$ (psi) | YIELD (g.) | MI (dg./min.) | $MF_{10}$ $MF_1$ |
|---|---|---|---|---|---|
| I | TEA | 80 | 52.5 | 0.35 | 39 |
| I | TEA | 90 | 50.2 | 0.78 | 33 |
| I | TEA | 100 | 49.4 | 1.1 | 32 |
| I | TIBA | 80 | 44.5 | 0.32 | 29 |
| I | TIBA | 90 | 44.6 | 0.61 | 31 |
| I | TIBA | 100 | 32.3 | 0.89 | 31 |
| II | TEA | 80 | 45.4 | 0.46 | 37 |
| II | TEA | 100 | 32.8 | 0.57 | 41 |
| III | TEA | 80 | 49.4 | 0.34 | 46 |
| III | TEA | 90 | 42.0 | 0.33 | 49 |
| III | TEA | 100 | 44.2 | 0.96 | 42 |
| III | TEA | 100 | 36.7 | 0.74 | 43 |

Examples I-IV and Table I illustrate the invented catalyst components, preparation thereof, and the use of such components in the polymerization of ethylene. It will be observed from the table that polymers prepared in the presence of the invented catalyst components exhibit relatively broad molecular weight distributions as indicated by $MF_{10}/MF_1$ ratios. Moreover, the catalyst components are sufficiently sensitive to hydrogen to allow for a high degree of control over polymer molecular weights. It also can be seen that polymer yields are sufficiently high relative to the amount of catalyst component employed that separation of catalyst residues is unnecessary. For example, in the first run reported in Table I, 52.5 g. polyethylene were produced in one hour using 1.0 mg. of catalyst component. This corresponds to an activity of 52,500 grams polymer per gram of catalyst component per hour.

EXAMPLE V

To illustrate some of the difficulties encountered when the titanium and magnesium compounds employed according to this invention are reacted in the presence of a hydrocarbon diluent, the following procedure was followed. To a 500 ml. flask equipped with magnetic stirrer and nitrogen purge were added 100 ml. titanium tetrabutoxide and 11 ml. titanium tetrachloride. These compounds were reacted, with stirring, at 80° C. for about ½ hour to form liquid titanium tributoxychloride. 31.0 g. magnesium (II) ethoxide and 22.5 ml. nonane then were added to 31 ml. of the liquid titanium tributoxychloride in a 1 liter flask equipped with mechanical stirrer. The resulting mixture was heated, with stirring, at 145° C. for one hour. As a result there was obtained a solid which absorbed the nonane. An additional 78 ml. nonane were added but the solid did not dissolve or mix and, as such, could not be used in further preparative steps.

EXAMPLE VI

To further illustrate difficulties associated with the use of a hydrocarbon diluent, a catalyst component was prepared as follows. Into a 1 liter flask equipped with mechanical stirrer and nitrogen purge were added 25 ml. titanium tributoxychloride, 100 ml. nonane, and 24.8 g. magnesium (II) ethoxide. This mixture was heated, with stirring, at 140° C. and a white solid began to form after about ½ hour. Heating was continued for another 1½ hours and then the contents of the flask were cooled to about 100° C. and 500 ml. hexane added. Temperature was maintained at 100° C. for an additional hour. There resulted a white solid which occupied most of the volume of the flask thus making subsequent transfers difficult. 100 ml. of a 50 wt.% solution of ethylaluminum dichloride in hexane were added dropwise to 304 ml. of the white solid reaction product mixture at about 15° to 20° C. over a period of about 20 min. to form a solid catalyst component identified hereafter as VIA. 103 ml. of ethylaluminum dichloride solution was added dropwise to the remainder of the white solid reaction product mixture at about 22° to 24° C. over approximately 1 hour to form a solid catalyst component identified hereafter as VIB. 400 ml. hexane were added to both VIA and VIB and then 2 ml. aliquots of the VIA suspension and 2.1 ml. aliquots of the VIB suspension were diluted with 40 ml. hexane.

EXAMPLE VII

Catalyst components VIA and VIB were employed in a series of ethylene polymerizations carried out according to the procedure of Example IV. Triethylaluminum (TEA) was used as the promoter in all runs. Results are reported in Table II.

TABLE II

| CATALYST COMPONENT AMOUNT (mg.) | TEA (mg.) | $H_2$ (psi) | YIELD (g) | MI (dg./min.) | $MF_{10}$ $MF_1$ |
|---|---|---|---|---|---|
| VIA | | | | | |
| 1.0 | 60 | 100 | 57.8 | 3.9 | — |
| 0.5 | 140 | 80 | 34.1 | 0.87 | 39.3 |
| 3.0 | 30 | 100 | 99.4 | 2.3 | 39.2 |
| VIB | | | | | |
| 1.06 | 120 | 80 | 66.2 | 1.7 | 35.2 |
| 3.18 | 10 | 80 | 130.5 | 1.1 | 37.2 |
| 1.06 | 60 | 100 | 43.2 | 4.2 | |

Examples V and VI illustrate some of the difficulties encountered when the magnesium and titanium components employed according to this invention are reacted in the presence of a hydrocarbon diluent rather than neat. It can be observed that without the use of a relatively large amount of diluent, a useful reaction product could not be prepared. Further, even when a relatively large amount of diluent was employed, subsequent preparative steps were made difficult due to the presence of the solid reaction product mixture. In spite of these difficulties, it can be observed from Example VI that catalyst components which are comparable to the invented components in terms of polymerization performance can be prepared by reacting magnesium (II) alkoxides and titanium (IV) alkoxyhalides in the presence of proper amounts of hydrocarbon diluent and then reacting the resulting product with an alkylaluminum halide.

It will be appreciated from the foregoing that a variety of modifications of this invention may be made by persons of skill in the art without departing from the scope of the invention as defined herein and in the appended claims.

We claim:

1. A method for preparing an alpha-olefin polymerization catalyst component comprising:
 (A) reacting components comprising a magnesium (II) alkoxide and a liquid titanium (IV) alkoxyhalide neat to form a neat, liquid reaction product, said magnesium (II) alkoxide and titanium (IV) alkoxyhalide being employed in amounts such that the molar ratio of elemental titanium to elemental magnesium ranges from about 0.1:1 to about 10:1; and
 (B) reacting said neat, liquid reaction product with an alkylaluminum halide, said alkylaluminum halide being employed in an amount which is effective to halide the titanium and magnesium contained in said neat, liquid reaction product.

2. The method of claim 1 wherein the alkylaluminum halide component contains from 1 to about 6 carbon atoms per alkyl radical, the magnesium (II) alkoxide component is a lower alkyl magnesium (II) alkoxide, and the titanium (IV) alkoxyhalide is a lower alkyl titanium (IV) alkoxychloride or alkoxybromide.

3. The method of claim 2 wherein the alkylaluminum halide component is an alkylaluminum dichloride, and the lower alkyl titanium IV alkoxyhalide is a titanium trialkoxychloride.

4. The method of claim 3 wherein the alkylaluminum dichloride is ethylaluminum dichloride, the lower alkyl magnesium (II) alkoxide is magnesium (II) ethoxide, and the lower alkyl titanium trialkoxychloride is titanium tributoxychloride.

5. The method of claim 1 further comprising carrying out (A) and (B) in the presence of an inert gas purge.

6. The method according to claim 1 further characterized in that the product from (B) is combined with an organometallic promoter selected from the group consisting of Group IA, IIA, IIB, IIIA, and IVA metal alkyls, hydrides, alkylhydrides, and alkylhalides in an amount which is effective to promote the polymerization activity of said product from (B).

7. The method according to claim 6 wherein the organometallic promoter is a Group IIIA metal alkyl or dialkylhydride having 1 to about 20 carbon atoms per alkyl radical.

8. The method of claim 7 wherein the organometallic promoter is triethylaluminum or triisobutyl aluminum.

9. The method of claim 2 further characterized in that the product from (B) is combined with triethyl aluminum or triisobutylaluminum in an amount which is effective to promote the polymerization activity of said product from (B).

10. The method of claim 3 further characterized in that the product from (B) is combined with triethyl aluminum or triisobutylaluminum in an amount which is effective to promote the polymerization activity of said product from (B).

11. The method of claim 14 further characterized in that the product from (B) is combined with triethyl aluminum or triisobutylaluminum in an amount which is effective to promote the polymerization activity of said product from (B).

12. The method of claim 5 further characterized in that the product from (B) is combined with triethylaluminum or triisobutylaluminum in an amount which is effective to promote the polymerization activity of said product from (B).

* * * * *

UNITED STATES PATENT OFFICE
CERTIFICATE OF CORRECTION

Patent No. 4,199,476            Dated April 22, 1980

Inventor(s) John L. Melquist and Glen R. Hoff

It is certified that error appears in the above-identified patent and that said Letters Patent are hereby corrected as shown below:

| Patent Column | Line | |
|---|---|---|
| 4 | 37 | "activity. p as" should be -- activity. As -- |
| 8 | 45 | "$MF_{10} \over MF_1$" should be -- $\overline{MF_{10} \over MF_1}$ -- |
| 9-10 | 65 & 4 | "component" should be -- COMPONENT -- |

Signed and Sealed this

Second Day of September 1980

[SEAL]

*Attest:*

SIDNEY A. DIAMOND

*Attesting Officer*     *Commissioner of Patents and Trademarks*